No. 647,112. Patented Apr. 10, 1900.
J. J. PEARSON.
COMPOSITION OF CORK AND RUBBER FOR BOOT HEELS, &c.
(Application filed June 11, 1897.)
(No Model.)
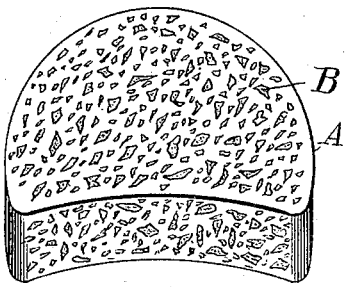
Witnesses:
C. L. Belcher
H. W. Parker
Inventor
Jas. J. Pearson
By Albert Stetson
Attorney

United States Patent Office.

JAMES J. PEARSON, OF NEW YORK, N. Y.

COMPOSITION OF CORK AND RUBBER FOR BOOT-HEELS, &c.

SPECIFICATION forming part of Letters Patent No. 647,112, dated April 10, 1900.

Application filed June 11, 1897. Serial No. 640,371. (No specimens.)

*To all whom it may concern:*

Be it known that I, JAMES J. PEARSON, a subject of Her Imperial Majesty Victoria, Queen of Great Britain, and a resident of New York city, in the county and State of New York, have invented certain new and useful Improvements in a Composition of Cork and Rubber Suitable for Boot-Heels and the Like, of which the following is a specification.

My invention relates to a new compound of cork and rubber. It is especially adapted for use in the heels or soles of boots and shoes, and while capable of as much wear as the materials ordinarily used in such articles possesses the advantages of offering considerable friction and preventing slipping.

To carry my invention into effect, I proceed as follows: I form a mixture of rubber thickly interspersed with granules of cork. (Whenever in this specification and claims the term "granule" or "granules" is used in application to cork, it means pieces varying in size from one-half inch to three-eighths of an inch before compression.) These being mixed with the rubber do not destroy its elasticity and render the surface of the composition non-liable to slip when worn as a heel or part of a heel or sole on shoes and when used on slippery surfaces, such as ice, wet asphalt, marble, granite, polished floors, and other pavements.

To form the material constituting the subject of my invention, I take granules of fine-quality cork, approximately three-eighths of an inch by one-half inch, and thickly intersperse them in a mass of liquid rubber, which may either be pure or tempered by some hardening mixture, such as barytes or other suitable ingredient. I then pass balls of this material under heated rolls, which flatten them into disks or plates of the required thickness. When it is desirable to make articles, such as shoe soles or heels, from the material, it is cut into "forms" of the desired size and shape, and these forms are placed in molds, where they are subject to the final pressure and finish. The final pressure is in the neighborhood of four thousand pounds to the square inch, and the temperature to which they are subjected during the final pressure is sufficient to liquefy the rubber, or approximately 600° Fahrenheit. The resultant product is a material in which each granule of cork is firmly confined in cubical compression and occupies about one-third of its former or normal space. Each cork granule in the material being reduced to about one-third its volume during pressure and being retained in that state by the surrounding walls of the rubber in which it is embedded, the constant tendency of the granules to expand to their normal dimensions holds them in place during any jarring or compression and release of the material incident to wear and contributes to the elasticity of the material.

My claim to originality in my invention is based upon the use of cork granules in composition with rubber and upon the peculiar physical characteristic of cork possessed by no other known solid—viz., its cubical compressibility. When used as the heel or sole of a shoe, it is obvious that any other material not having this property if mixed with rubber and subjected in its divided state (throughout the rubber) to the alternate compression and release consequent on the act of walking would tend either to cut through or force aside the walls of rubber forming the cells or matrices which contain it, and thus eventually fall out, or, failing this, would itself be disintegrated and fall out, whereas with cork the tendency is always to restore itself to its normal cubic dimensions. Cork is distinct from all other bodies, solid or liquid, by its power of being diminished in volume under pressure and returning to its normal dimensions. No other known solid is capable of appreciable cubical compression together with ability to expand back to its original volume after the pressure is released; but cork under pressure will bear a seventy-five-per-cent. reduction of volume without impairment of its elasticity or tendency to expand back to its normal dimensions.

This property has three distinct results—

(*a*) To hold the cork securely in its matrix of rubber either during repose or when under strain.

(*b*) As the wear of the heel-face exposes more of the cork, it follows that the expansion of the latter will be in the direction of its exposed surface—that being its only free side—thereby tending to equalize the wear of the cork and rubber, whereas if the cork were not embedded under pressure the compression of the heel during walking would wear the exposed surface of each cork granule to a depth below the heel's surface, with the result that the heel's surface would be "pitted" or honeycombed to a depth equal to the rubber's compression, a condition that would practically mean nothing more than a plain rubber heel so far as the wearer is concerned.

(c) The equality of wearing-face thus obtained secures an increased "grip" on slippery surfaces in the direct ratio of the friction of cork over rubber and the exposed surface area of each.

I am aware that it has been proposed to embody in rubber felt, asbestos, and various vegetal fibers; but these are all different in their action from my use of compressed cork. These will all cause the rubber surface to become pitted after use and offer none of the advantages of my composition.

The drawing shows a complete heel formed of my composition.

B represents the granules of cork in their compressed state in the matrix A of rubber. I have not considered it necessary to show a top lift or a sole, as they are formed of the same material.

Having thus described my invention and the method in which it is to be carried out, what I claim is—

1. A composition of matter composed of an intimate mixture of cork and rubber, the cork being held under great compression in the rubber.

2. As a composition of matter, rubber and cork granules, the latter compressed to a fraction of their normal size, and retained by cubical expansion in intimate contact with the rubber.

3. A composition of matter composed of a mixture of rubber and cubically-compressed cork.

4. As a composition of matter, an elastic material composed of an intimate mixture of rubber and granules of cork, the latter being in a state of great compression and tending by their expansive quality to compensate for frictional wear.

In testimony that I claim the foregoing as my invention I have signed my name, in presence of two witnesses, this 10th day of June, 1897.

JAS. J. PEARSON.

Witnesses:
ALICE MAYGLOTHLING,
CHARLES KLUGER.